Patented Sept. 11, 1934

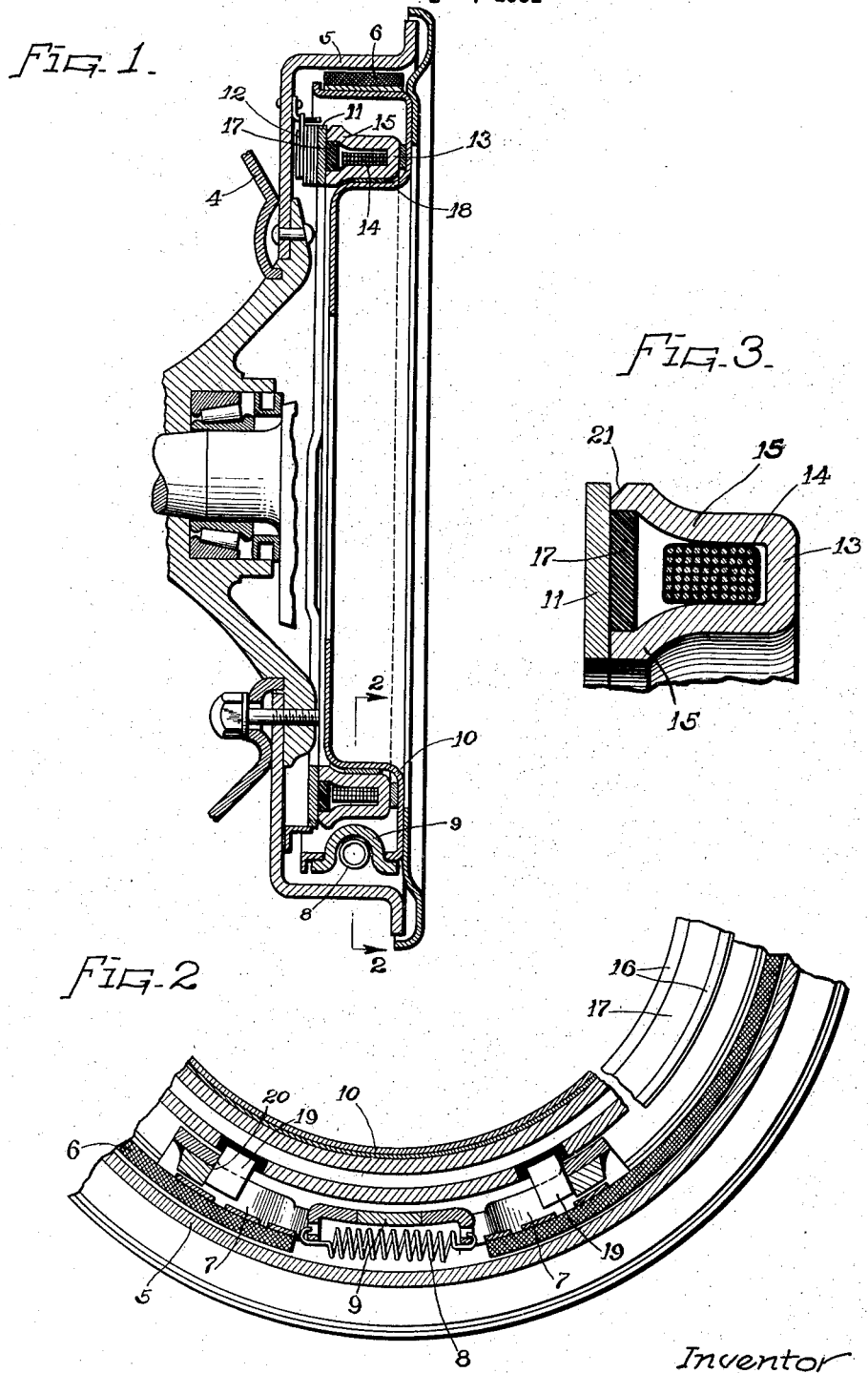

1,973,551

UNITED STATES PATENT OFFICE 1,973,551

ELECTROMAGNETIC FRICTION DEVICE

Arthur P. Warner, Beloit, Wis., assignor to Warner Electric Brake Corporation, South Beloit, Ill., a corporation of Illinois Application August 3, 1931, Serial No. 554,817

5 Claims. (Cl. 188—140)

This invention relates to improvements in electromagnetic friction devices and more particularly to a device comprising an annular magnet having two concentric poles with faces terminating at a friction surface adapted for gripping engagement with a flat armature ring upon excitation of a winding disposed between said poles. Ordinary wear resisting friction material is interposed between the poles substantially flush with the pole faces.

In friction devices constructed as above described, it has been found that a considerable period of "wearing in" is required before the maximum strength of the magnet is attained and thereafter the outer pole face wears more rapidly than the inner face eventually causing a material reduction in the strength of the magnet. The theoretical reason for this detrimental action is not as yet understood.

The object of the present invention is to provide a novel construction of the magnetic poles which overcomes the objectionable condition inherent in prior friction devices of the above character.

Other objects and advantages of the invention will become apparent from the following detailed description taken in conjunction with the accompanying drawing, in which Figure 1 is a fragmentary diametrically sectional view of an electrically controlled vehicle brake having a friction device embodying the features of the present invention.

Fig. 2 is a fragmentary sectional view taken substantially along the line 2—2 in Fig. 1.

Fig. 3 is an enlarged sectional view of the magnet and its armature.

The brake shown in the drawing is adapted to be applied to a vehicle wheel 4 and comprises generally a rotable drum 5 and an expansible friction band 6 extending around the inner drum surface. The ends of the band are disposed adjacent each other and carry brackets 7 which are drawn by a spring 8 into abutting engagement with a stop 9 rigid with the anchor plate 10 closing the open end of the drum.

The friction device in which the present invention is embodied includes an armature ring 11 having a flat inwardly facing friction surface and supported concentric with the drum axis for a limited degree of floating axial movement by a plurality of flexible metal strips 12 arranged as secants of the armature ring with their opposite ends secured to the drum and ring respectively. The magnet of the device comprises a ring 13 of magnetic material and U-shaped cross-section having an annular winding 14 dispose between its two poles 15 whose radially spaced faces 16 (Fig. 2) are disposed in a common plane substantially flush with the face of a wear ring 17 mounted between the poles and forming with the poles a wear resisting surface.

The magnet ring 13 is supported by a cylindrical portion 18 of the anchor plate 10 and thus is adapted to oscillate about the drum axis with its friction face disposed perpendicular to such axis.

The armature ring 11 overlaps the two pole faces and thus completely closes the magnetic circuit around the winding 14 when the friction material 17 has worn off flush with the poles. In view of this closed circuit, a powerful attractive force causing friction gripping engagement of the magnetic and armature surfaces is developed when the winding 14 is excited. The magnet is carried along frictionally with the armature, in the direction of rotation of the drum and in this motion a lug 19 rigid with and projecting outwardly from the magnet, acts on a shoulder 20 on one of the brackets 7 to move one end of the band away from the stop 9 thereby expanding the band and applying the brake. Upon de-energization of the magnet, the latter and the actuated end of the band are returned to brake-released position by the spring 8.

I have discovered that the uneven wearing of the pole faces in friction devices of the above character and the necessity for long periods of "wearing in" in order to develop the maximum strength of the magnet, may be avoided by rounding or bevelling one peripheral edge of the outer magnet pole as is shown in part in Fig. 3. Preferably, the outer edge is formed with a bevelled surface 21 and best results have been obtained when the angle of bevel is approximately 45 degrees with respect to the pole face which the surface 21 intersects and the extent of the bevel is such as to reduce the radial width of the pole face proper to substantially less than the width of the inner pole face. Uniform wear of the pole faces is obtained when the outer pole face area is slightly greater than half the area of the inner pole face.

Such a construction of the outer pole produces a condition of over-saturation at the pole face, the calculated flux density being above the saturation point for the material used. Nevertheless, there is an apparent increase in the strength of the outer pole with the result that the attractive force resulting from energization of the magnet winding is uniform at all points of contact between the armature and magnet. This results in equalized wear at the pole faces with the result that the friction surface of the magnet remains truly perpendicular to the drum axis in wearing down through service use of the brake. Moreover, with the magnet thus constructed, the friction device requires very little "wearing in" for the magnet to attain its maximum strength and therefore for the brake to develop its intended decelerating capacity.

I claim as my invention:

1. An electromagnetic friction device combining a ring of magnetic material having a U-shaped cross-section and two radially spaced poles with faces disposed in a plane perpendicular to the ring axis and separated by wear resisting friction material, an annular winding disposed between said poles, an armature ring having a flat friction surface adapted for gripping engagement with the friction surface formed by said material and said faces, the outer peripheral edge of said magnet pole being formed with a bevelled surface disposed at an angle of approximately 45 degrees to the pole face the area of which is approximately half that of the inner pole face.

2. An electromagnetic friction device combining a ring of magnetic material having two radially spaced poles with faces disposed in a common plane, an armature ring having a friction surface overlapping said poles and adapted for gripping engagement with the friction surface of the magnet, a winding adapted when energized to produce a magnetic flux threading the circuit through said poles and said armature, the outer pole of said magnet having a face area less than the inner pole and one of its peripheral edges being bevelled at an angle of approximately 45 degrees to the pole face.

3. An electromagnetic friction device combining a ring of magnetic material having two radially spaced poles with faces disposed in a common plane, an armature ring having a friction surface overlapping said poles and adapted for gripping engagement with the friction surface of the magnet, a winding adapted when energized to produce a magnetic flux threading the circuit through said poles and said armature, the outer pole of said magnet having a bevelled edge reducing the pole face area to approximately one-half that of the inner pole face area.

4. An electromagnetic friction device combining a ring of magnetic material having two radially spaced poles with faces disposed in a common plane, an armature ring having a friction surface overlapping said poles and adapted for gripping engagement with the friction surface of the magnet, a winding adapted when energized to produce a magnetic flux threading the circuit through said poles and said armature, the outer pole of said magnet having a peripheral edge surface disposed at an angle to the pole face proper, the latter being of substantial narrower radial width than the face of the inner magnetic pole.

5. An electromagnetic friction device combining a ring of magnetic material of generally U-shaped cross-section providing radially spaced inner and outer poles with faces disposed in a common plane, an armature ring having a surface facing and overlapping said pole faces, a winding disposed between said poles and adapted when energized to produce magnetic flux threading the circuit through said poles and said armature ring, the radial cross-sectional width of said outer pole decreasing toward said armature to a width substantially less than the radial width of the inner pole face.

ARTHUR P. WARNER.